United States Patent

Caldara et al.

Patent Number: 6,141,346
Date of Patent: Oct. 31, 2000

[54] POINT-TO-MULTIPOINT TRANSMISSION USING SUBQUEUES

[75] Inventors: Stephen A. Caldara, Sudbury; Stephen A. Hauser, Burlington; Thomas A. Manning, Northboro, all of Mass.

[73] Assignees: Fujitsu Network Communications, Inc., Richardson, Tex.; Fujitsu Limited, Kawasaki, Japan

[21] Appl. No.: 08/683,131

[22] Filed: Jul. 18, 1996

Related U.S. Application Data

[60] Provisional application No. 60/001,498, Jul. 19, 1995.

[51] Int. Cl.[7] .................................................. H04L 12/00
[52] U.S. Cl. ........................................... 370/390; 370/413
[58] Field of Search .................................... 370/389, 390, 370/394, 395, 412, 413, 414, 386, 396, 398, 415, 416, 417, 418, 432; 340/825.89

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |

(List continued on next page.)

FOREIGN PATENT DOCUMENTS 484943  3/1992  Japan.

OTHER PUBLICATIONS

*Head of Line Arbitration in ATM Swithches with Input–Output Buffering and Backpressure Control.* by Hosien F. Badran and H. T. Mouftah, *Globecom* '91, pp. 0347–0351.

(List continued on next page.)

*Primary Examiner*—Ricky Ngo
*Attorney, Agent, or Firm*—Weingarten, Schurgin, Gagnebin & Hayes LLP

[57] ABSTRACT

An Asynchronous Transfer Mode switch and method which facilitate point-to-multipoint transmission are disclosed. Each input port within the switch includes a switch allocation table ("SAT") which manages bandwidth allocation and delay. Each SAT includes a plurality of sequentially ordered cell time slots, a subqueue and a synchronized pointer which is directed to one of the slots such that at any given point in time each of the pointers is directed to the same slot location in the respective SAT with which the pointer is associated. To execute point-to-multipoint operation where output port conflicts are present the switch transmits copies of the cell to the output ports at different points in time. More particularly, the switch transmits copies of the cell to available output ports, and tracks such transmission for managing future transmission to unserviced output ports. To track transmission the switch includes a map and scoreboard. The subqueues are used to index into a table and may be associated with one or more output ports. The map indicates which subqueues, and hence which output ports, are initially eligible to receive a copy of the cell. The scoreboard indicates which subqueues, and hence which output ports, have received a copy of the cell. Tracking is realized by updating the scoreboard when copies of cells are transmitted. Copies of the cell are not sent to already serviced output ports. When each designated subqueue has been service, and hence each associated output port has been serviced, the cell is dequeued.

25 Claims, 5 Drawing Sheets

U.S. PATENT DOCUMENTS

| | | |
|---|---|---|
| 4,899,333 | 2/1990 | Roediger .................................. 370/60 |
| 4,920,531 | 4/1990 | Isono et al. ............................... 370/60 |
| 4,922,503 | 5/1990 | Leone .................................. 370/85.13 |
| 4,933,938 | 6/1990 | Sheehy ................................ 370/85.13 |
| 4,947,390 | 8/1990 | Sheehy ................................ 370/85.13 |
| 4,953,157 | 8/1990 | Franklin et al. ......................... 370/60 |
| 4,956,839 | 9/1990 | Torii et al. ............................... 370/60 |
| 4,958,341 | 9/1990 | Hemmady et al. ..................... 370/60.1 |
| 4,979,100 | 12/1990 | Makris et al. .......................... 364/200 |
| 4,993,018 | 2/1991 | Hajikano et al. ......................... 370/60 |
| 5,021,949 | 6/1991 | Morten et al. .......................... 364/200 |
| 5,029,164 | 7/1991 | Goldstein et al. ..................... 370/95.1 |
| 5,060,228 | 10/1991 | Tsutsui et al. ........................ 370/85.13 |
| 5,067,123 | 11/1991 | Hyodo et al. .......................... 370/58.1 |
| 5,070,498 | 12/1991 | Kakuma et al. ........................... 370/60 |
| 5,083,269 | 1/1992 | Syobatake et al. ...................... 395/425 |
| 5,084,867 | 1/1992 | Tachibana et al. ....................... 370/60 |
| 5,084,871 | 1/1992 | Carn et al. ............................. 370/94.1 |
| 5,090,011 | 2/1992 | Fukuta et al. ............................ 370/60 |
| 5,090,024 | 2/1992 | Vander Mey et al. ...................... 375/1 |
| 5,093,912 | 3/1992 | Dong et al. ............................. 395/650 |
| 5,115,429 | 5/1992 | Hluchyj et al. ............................ 370/84 |
| 5,119,369 | 6/1992 | Tanabe et al. ............................. 370/60 |
| 5,119,372 | 6/1992 | Verbeek ................................ 370/85.3 |
| 5,128,932 | 7/1992 | Li ........................................... 370/60 |
| 5,130,975 | 7/1992 | Akata ..................................... 370/60 |
| 5,130,982 | 7/1992 | Ash et al. ............................... 370/85.7 |
| 5,132,966 | 7/1992 | Hayano et al. .......................... 370/79 |
| 5,146,474 | 9/1992 | Nagler et al. ............................. 375/10 |
| 5,146,560 | 9/1992 | Goldberg et al. ...................... 385/200 |
| 5,150,358 | 9/1992 | Punj et al. ................................ 370/84 |
| 5,151,897 | 9/1992 | Suzuki ................................ 370/85.13 |
| 5,157,657 | 10/1992 | Potter et al. ............................ 370/85 |
| 5,163,045 | 11/1992 | Caram et al. .......................... 370/60.1 |
| 5,163,046 | 11/1992 | Hahne et al. ............................. 370/79 |
| 5,179,556 | 1/1993 | Turner ................................... 370/94.1 |
| 5,179,558 | 1/1993 | Thacker et al. ........................ 370/94.3 |
| 5,185,743 | 2/1993 | Murayama et al. .................. 370/110.1 |
| 5,191,582 | 3/1993 | Upp ...................................... 370/94.1 |
| 5,191,652 | 3/1993 | Dias et al. .............................. 395/200 |
| 5,193,151 | 3/1993 | Jain ....................................... 395/200 |
| 5,197,067 | 3/1993 | Fujimoto et al. ....................... 370/94.1 |
| 5,198,808 | 3/1993 | Kudo .................................. 340/825.8 |
| 5,199,027 | 3/1993 | Barri ....................................... 370/60 |
| 5,239,539 | 8/1993 | Uchida et al. .......................... 370/58.3 |
| 5,253,247 | 10/1993 | Hirose et al. ............................ 370/14 |
| 5,253,248 | 10/1993 | Dravida et al. ........................... 370/16 |
| 5,255,264 | 10/1993 | Cotton et al. ............................. 370/24 |
| 5,255,266 | 10/1993 | Watanabe et al. ..................... 370/60.1 |
| 5,257,311 | 10/1993 | Naito et al. ............................... 380/48 |
| 5,258,979 | 11/1993 | Oomuro et al. ........................ 370/95.1 |
| 5,265,088 | 11/1993 | Takigawa et al. ......................... 370/15 |
| 5,267,232 | 11/1993 | Katsube et al. ........................... 370/17 |
| 5,268,897 | 12/1993 | Komine et al. ........................... 370/60 |
| 5,271,010 | 12/1993 | Miyake et al. ......................... 370/94.1 |
| 5,272,697 | 12/1993 | Fraser et al. .............................. 370/61 |
| 5,274,641 | 12/1993 | Shobatake et al. .................... 370/94.1 |
| 5,274,768 | 12/1993 | Traw et al. ............................. 395/275 |
| 5,280,469 | 1/1994 | Taniguchi et al. ......................... 370/13 |
| 5,280,470 | 1/1994 | Buhrke et al. ............................. 370/13 |
| 5,282,201 | 1/1994 | Frank et al. ............................. 370/94.1 |
| 5,283,788 | 2/1994 | Morita et al. ......................... 370/110.1 |
| 5,285,446 | 2/1994 | Yonehara ............................... 370/60.1 |
| 5,287,349 | 2/1994 | Hyodo et al. ........................... 370/60.1 |
| 5,287,535 | 2/1994 | Sakagawa et al. ......................... 370/60 |
| 5,289,462 | 2/1994 | Ahmadi et al. ......................... 370/60.1 |
| 5,289,463 | 2/1994 | Mobasser ............................... 370/68.1 |
| 5,289,470 | 2/1994 | Chang et al. ........................... 370/94.1 |
| 5,291,481 | 3/1994 | Doshi et al. ............................... 370/79 |
| 5,291,482 | 3/1994 | McHarg et al. ........................... 370/60 |
| 5,295,134 | 3/1994 | Yoshimura et al. ....................... 370/16 |
| 5,301,055 | 4/1994 | Bagchi et al. ........................... 395/139 |
| 5,301,184 | 4/1994 | Uriu et al. ................................. 370/60 |
| 5,301,190 | 4/1994 | Tsukuda et al. ........................... 370/66 |
| 5,301,193 | 4/1994 | Toyofuku et al. ....................... 370/94.1 |
| 5,303,232 | 4/1994 | Faulk, Jr. .................................. 370/94 |
| 5,305,311 | 4/1994 | Lyles ........................................ 370/60 |
| 5,309,431 | 5/1994 | Tominaga et al. ......................... 370/60 |
| 5,309,438 | 5/1994 | Nakajima .............................. 370/94.1 |
| 5,311,586 | 5/1994 | Bogart et al. ........................... 379/221 |
| 5,313,454 | 5/1994 | Bustini et al. ............................. 370/13 |
| 5,313,458 | 5/1994 | Suzuki ..................................... 370/56 |
| 5,315,586 | 5/1994 | Charvillat ................................. 370/60 |
| 5,319,638 | 6/1994 | Lin ........................................... 370/60 |
| 5,321,695 | 6/1994 | Proctor et al. ............................. 370/60 |
| 5,323,389 | 6/1994 | Bitz et al. ............................... 370/60.1 |
| 5,333,131 | 7/1994 | Tanabe et al. ............................. 370/54 |
| 5,333,134 | 7/1994 | Ishibashi et al. ....................... 370/94.1 |
| 5,335,222 | 8/1994 | Kamoi et al. ............................. 370/60 |
| 5,335,325 | 8/1994 | Frank et al. ............................. 395/200 |
| 5,339,310 | 8/1994 | Taniguchi ................................. 370/60 |
| 5,339,317 | 8/1994 | Tanaka et al. ......................... 370/85.15 |
| 5,339,318 | 8/1994 | Tanaka et al. ........................ 370/110.1 |
| 5,341,366 | 8/1994 | Soumiya et al. .......................... 370/17 |
| 5,341,373 | 8/1994 | Ishibashi et al. ....................... 370/85.9 |
| 5,341,376 | 8/1994 | Yamashita ................................ 370/99 |
| 5,345,229 | 9/1994 | Olnowich et al. ................... 340/825.8 |
| 5,350,906 | 9/1994 | Brody et al. ............................ 235/379 |
| 5,355,372 | 10/1994 | Sengupta et al. .......................... 370/60 |
| 5,357,506 | 10/1994 | Sugawara ................................. 370/60 |
| 5,357,507 | 10/1994 | Hughes et al. ............................ 370/60 |
| 5,357,508 | 10/1994 | Le Boudec et al. .................... 370/58.3 |
| 5,357,510 | 10/1994 | Norizuki et al. ....................... 370/60.1 |
| 5,359,600 | 10/1994 | Ueda et al. ............................ 370/60.1 |
| 5,361,251 | 11/1994 | Aihara et al. ............................. 370/60 |
| 5,361,372 | 11/1994 | Rege et al. ............................. 395/800 |
| 5,363,433 | 11/1994 | Isono ...................................... 379/92 |
| 5,371,893 | 12/1994 | Price et al. .............................. 395/725 |
| 5,373,504 | 12/1994 | Tanaka et al. ......................... 370/60.1 |
| 5,375,117 | 12/1994 | Morita et al. ............................. 370/79 |
| 5,377,262 | 12/1994 | Bales et al. ............................. 379/220 |
| 5,377,327 | 12/1994 | Jain et al. ............................... 395/200 |
| 5,379,297 | 1/1995 | Glover et al. .......................... 370/60.1 |
| 5,379,418 | 1/1995 | Shimazaki et al. ..................... 395/575 |
| 5,390,170 | 2/1995 | Sawant et al. .......................... 370/58.1 |
| 5,390,174 | 2/1995 | Jugel ........................................ 370/60 |
| 5,390,175 | 2/1995 | Hiller et al. ............................... 370/60 |
| 5,392,280 | 2/1995 | Zheng ...................................... 370/60 |
| 5,392,402 | 2/1995 | Robrock, II ............................ 395/200 |
| 5,394,396 | 2/1995 | Yoshimura et al. ....................... 370/60 |
| 5,394,397 | 2/1995 | Yanagi et al. .......................... 370/60.1 |
| 5,398,235 | 3/1995 | Tsuzuki et al. ............................ 370/16 |
| 5,400,337 | 3/1995 | Munter .................................. 370/60.1 |
| 5,402,415 | 3/1995 | Turner .................................... 370/390 |
| 5,412,648 | 5/1995 | Fan .......................................... 370/60 |
| 5,414,703 | 5/1995 | Sakaue et al. ............................. 370/60 |
| 5,420,858 | 5/1995 | Marshall et al. ....................... 370/60.1 |
| 5,420,988 | 5/1995 | Elliott .................................... 395/275 |
| 5,422,879 | 6/1995 | Parsons et al. ............................ 370/60 |
| 5,425,021 | 6/1995 | Derby et al. .............................. 370/54 |
| 5,425,026 | 6/1995 | Mori ........................................ 370/60 |
| 5,432,713 | 7/1995 | Takeo et al. ............................ 364/514 |
| 5,432,784 | 7/1995 | Ozveren .................................. 370/79 |
| 5,432,785 | 7/1995 | Ahmed et al. ............................. 370/79 |
| 5,432,908 | 7/1995 | Heddes et al. .......................... 395/250 |
| 5,436,886 | 7/1995 | McGill ..................................... 370/16 |
| 5,436,893 | 7/1995 | Barnett .................................. 370/60.1 |
| 5,440,547 | 8/1995 | Easki et al. ............................... 370/60 |
| 5,444,702 | 8/1995 | Burnett et al. .......................... 370/60.1 |
| 5,446,733 | 8/1995 | Tsuruoka ............................... 370/60.1 |
| 5,446,737 | 8/1995 | Cidon et al. ........................... 370/85.5 |
| 5,446,738 | 8/1995 | Kim et al. .............................. 370/94.2 |
| 5,448,559 | 9/1995 | Hayter et al. .......................... 370/60.1 |
| 5,450,406 | 9/1995 | Esaki et al. ............................. 370/60.1 |
| 5,452,296 | 9/1995 | Shimizu ................................. 370/60.1 |
| 5,455,820 | 10/1995 | Yamada .................................. 370/17 |
| 5,455,825 | 10/1995 | Lauer et al. ............................... 370/60 |
| 5,457,687 | 10/1995 | Newman ................................ 370/85.3 |
| 5,459,743 | 10/1995 | Fukuda et al. ......................... 371/67.1 |
| 5,461,611 | 10/1995 | Drake Jr. et al. .......................... 370/54 |

| | | | | |
|---|---|---|---|---|
| 5,463,620 | 10/1995 | Sriram | | 370/60 |
| 5,465,331 | 11/1995 | Yang et al. | | 395/200.08 |
| 5,475,679 | 12/1995 | Munter | | 370/58.2 |
| 5,479,401 | 12/1995 | Bitz et al. | | 370/60.1 |
| 5,479,402 | 12/1995 | Hata et al. | | 370/60.1 |
| 5,483,526 | 1/1996 | Ben-Nun et al. | | 370/60.1 |
| 5,485,453 | 1/1996 | Wahlman et al. | | 370/16 |
| 5,485,455 | 1/1996 | Dobbins et al. | | 370/60 |
| 5,487,063 | 1/1996 | Kakuma et al. | | 370/56 |
| 5,488,606 | 1/1996 | Kakuma et al. | | 370/16 |
| 5,491,691 | 2/1996 | Shtayer et al. | | 370/61 |
| 5,491,694 | 2/1996 | Oliver et al. | | 370/85.4 |
| 5,493,566 | 2/1996 | Ljungberg et al. | | 370/60 |
| 5,497,369 | 3/1996 | Wainwright | | 370/390 |
| 5,499,238 | 3/1996 | Shon | | 370/60.2 |
| 5,504,741 | 4/1996 | Yamanaka et al. | | 370/58.2 |
| 5,504,742 | 4/1996 | Kakuma et al. | | 370/60.1 |
| 5,506,834 | 4/1996 | Sekihata et al. | | 370/17 |
| 5,506,839 | 4/1996 | Hatta | | 370/60 |
| 5,506,956 | 4/1996 | Cohen | | 395/182.04 |
| 5,509,001 | 4/1996 | Tachibana et al. | | 370/17 |
| 5,509,007 | 4/1996 | Takashima et al. | | 370/60.1 |
| 5,513,134 | 4/1996 | Cooperman et al. | | 365/49 |
| 5,513,178 | 4/1996 | Tanaka | | 370/58.2 |
| 5,513,180 | 4/1996 | Miyake et al. | | 370/60.1 |
| 5,515,359 | 5/1996 | Zheng | | 370/13 |
| 5,517,495 | 5/1996 | Lund et al. | | 370/60 |
| 5,519,690 | 5/1996 | Suzuka et al. | | 370/17 |
| 5,521,905 | 5/1996 | Oda et al. | | 370/17 |
| 5,521,915 | 5/1996 | Dieudonne et al. | | 370/60.1 |
| 5,521,916 | 5/1996 | Choudhury et al. | | 370/60.1 |
| 5,521,917 | 5/1996 | Watanabe et al. | | 370/1 |
| 5,521,923 | 5/1996 | Willmann et al. | | 370/94.1 |
| 5,523,999 | 6/1996 | Takano et al. | | 370/58.2 |
| 5,524,113 | 6/1996 | Gaddis | | 370/60.1 |
| 5,526,344 | 6/1996 | Diaz et al. | | 370/16 |
| 5,528,588 | 6/1996 | Bennett et al. | | 370/60 |
| 5,528,590 | 6/1996 | Iidaka et al. | | 370/60.1 |
| 5,528,591 | 6/1996 | Lauer | | 370/79 |
| 5,530,695 | 6/1996 | Dighe et al. | | 370/17 |
| 5,533,009 | 7/1996 | Chen | | 370/17 |
| 5,533,020 | 7/1996 | Byrn et al. | | 370/60.1 |
| 5,535,196 | 7/1996 | Aihara et al. | | 370/60 |
| 5,535,197 | 7/1996 | Cotton | | 370/60 |
| 5,537,394 | 7/1996 | Abe et al. | | 370/17 |
| 5,541,912 | 7/1996 | Choudhury et al. | | 370/17 |
| 5,544,168 | 8/1996 | Jeffrey et al. | | 370/60.1 |
| 5,544,169 | 8/1996 | Norizuki et al. | | 370/60.1 |
| 5,544,170 | 8/1996 | Kasahara | | 370/84 |
| 5,546,389 | 8/1996 | Wippenbeck et al. | | 370/60 |
| 5,546,391 | 8/1996 | Hochschild et al. | | 370/60 |
| 5,546,392 | 8/1996 | Boal et al. | | 370/60.1 |
| 5,550,821 | 8/1996 | Akiyoshi | | 370/60.1 |
| 5,550,823 | 8/1996 | Irie et al. | | 370/60.1 |
| 5,553,057 | 9/1996 | Nakayama | | 370/13 |
| 5,553,068 | 9/1996 | Aso et al. | | 370/60 |
| 5,555,243 | 9/1996 | Kakuma et al. | | 370/58.2 |
| 5,555,265 | 9/1996 | Kakuma et al. | | 370/60 |
| 5,557,607 | 9/1996 | Holden | | 370/58.2 |
| 5,568,479 | 10/1996 | Watanabe et al. | | 370/60.1 |
| 5,570,361 | 10/1996 | Norizuki et al. | | 370/60.1 |
| 5,570,362 | 10/1996 | Nishimura | | 370/60.1 |
| 5,572,522 | 11/1996 | Calamvokis et al. | | 370/60.1 |
| 5,577,032 | 11/1996 | Sone et al. | | 370/58.3 |
| 5,577,035 | 11/1996 | Hayter et al. | | 370/390 |
| 5,583,857 | 12/1996 | Soumiya et al. | | 370/233 |
| 5,583,858 | 12/1996 | Hanaoka | | 370/392 |
| 5,583,861 | 12/1996 | Holden | | 370/395 |
| 5,590,132 | 12/1996 | Ishibashi et al. | | 370/236 |
| 5,602,829 | 2/1997 | Nie et al. | | 370/235 |
| 5,610,913 | 3/1997 | Tomonaga et al. | | 370/219 |
| 5,623,405 | 4/1997 | Isono | | 395/230 |
| 5,625,846 | 4/1997 | Kobayakawa et al. | | 395/872 |
| 5,633,861 | 5/1997 | Hanson et al. | | 370/232 |

OTHER PUBLICATIONS

An Ascom Timeplex White Paper, *Meeting Critical Requirements with Scalable Enterprise Networking Solutions Based on a Unified ATM Foundation*, pp. 1–12, April 1994–April 1995?

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

Flavio Bonomi et al., *The Rate–Based Flow Control Framework for the Available Bit Rate ATM Service,* IEEE Network, Mar./Apr. 1995, pp. 25–39.

R. Jain, *Myths About Congestion Management in High Speed Networks,* Internetworking Research and Experience, vol. 3, 101–113 (1992).

Douglas H. Hunt et al., *Credit–Based FCVC Proposal for ATM Traffic Management (Revision R1),* ATM Forum Technical Committee Traffic Management Subworking Group, ATM_Forum/94–0168R1, Apr. 28, 1994.

Douglas H. Hunt et al., *Action Item Status for Credit–Based FCVC Proposal,* ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation,* ATM Forum Technical Committee, ATM Forum/94–0460, Apr. 28, 1994.

Richard Bubenick et al., *Leaf Initiated Join Extensions,* Technical Committee, Signalling Subworking Group, ATM Forum/94–0325, Apr. 28, 1994.

Rob Coltun et al., *PRP: A P–NNI Routing Protocol Proposal,* ATM Forum Technical Committee, ATM_Forum/94–0492, Apr. 28, 1994.

Richard Bubenik et al., *Leaf Initiated Join Extensions,* ATM Forum Technical Committee, Signalling Subworking Group, ATM Forum 94–0325, Apr. 28, 1994.

Richard Bubenik et al., *Requirements For Phase 2 Signaling Protocol,* ATM Forum Technical Committee, Signalling Subworking Group, ATM Forum 94–1078, Jan. 1, 1994.

SITA, ATM RFP: C–Overall Technical Requirements, Sep. 1994.

H.T. Kung and K. Chang, *Receiver–Oriented Adaptive Buffer Allocation in Credit–Based Flow Control for ATM Networks,* Proceedings of INFOCOM '95, Apr. 2–6, 1995, pp. 1–14.

H.T. Kung, et al., *Credit–Based Flow Control for ATM Networks: Credit Update Protocol, Adaptive Credit Allocation, and Statistical Multiplexing,* Proceedings of ACM SIGCOMM '94 Symposium on Communications Architectures, Protocols and Applications, Aug. 31–Sep. 2, 1994, pp. 1–14.

POINT-TO-MULTIPOINT TRANSMISSION USING SUBQUEUES

RELATED APPLICATION

A claim of priority is made to provisional application 60/001,498 entitled COMMUNICATION METHOD AND APPARATUS, filed Jul. 19, 1995.

FIELD OF THE INVENTION

The present invention is generally related to telecommunications networks, and more particularly to bandwidth allocation and delay management within an asynchronous transfer mode switch.

BACKGROUND OF THE INVENTION

Telecommunications networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

One problem associated with ATM networks is loss of cells. Cells are buffered within each switch before being routed and transmitted from the switch. More particularly, switches typically have buffers at either the inputs or outputs of the switch for temporarily storing cells prior to transmission. As network traffic increases, there is an increasing possibility that buffer space may be inadequate and data lost. If the buffer size is insufficient, cells are lost. Cell loss causes undesirable interruptions in audio and video data transmissions, and may cause more serious damage to other types of data transmissions.

One particular situation where cell loss occurs is in point-to-multipoint transmission. In point-to-multipoint transmission a cell is transmitted from a single input to multiple outputs across the switch fabric. In order to execute such a transmission, each of the designated outputs must be available to receive the cell from the transmitting input, i.e., have adequate buffer space. However, the likelihood that each of the designated outputs will be simultaneously prepared to receive the cell when the cell is enqueued decreases as traffic within the switch increases. In some circumstances this may result in delayed transmission. In the worst case, cells will be delayed indefinitely and discarded. It would therefore be desirable to facilitate point-to-multipoint transmission by reducing or eliminating delays and cell loss.

SUMMARY OF THE INVENTION

An Asynchronous Transfer Mode ("ATM") switch and method which facilitate point-to-multipoint transmission is disclosed. The ATM switch includes a plurality of input ports and a plurality of output ports. Each input port within the switch includes a switch allocation table ("SAT") which manages bandwidth allocation and delay. Each SAT includes a plurality of sequentially ordered cell time slots, a subqueue associated with each cell time slot and a pointer which is directed to one of the slots. The SAT pointers at each input port are synchronized such that, at any given point in time, each of the pointers is directed to the same slot location in the respective SAT with which the pointer is associated.

To execute point-to-multipoint operation where output port conflicts are present the switch transmits copies of the cell to the output ports at different points in time. More particularly, the switch transmits copies of the cell to available output ports and tracks such transmission for managing future transmission to unserviced output ports. To track transmission the switch includes a map and scoreboard. The map indicates which subqueues, and hence which output ports, are initially eligible to receive a copy of the cell. The scoreboard indicates which subqueues, and hence which output ports, have received a copy of the cell. Tracking is realized by updating the scoreboard, i.e., toggling bits corresponding to serviced output ports, when copies of cells are transmitted. When subsequent opportunities to transmit arise as the SAT pointers are advanced, copies of the cell are not sent to already serviced output ports. When each designated output port has been serviced, the cell is dequeued.

Point-to-multipoint transmission is facilitated by transmitting copies of the cell at different points in time when output port collisions are detected. Due to cell traffic, a situation will sometimes arise where only a subset of the cells designated for receipt of a copy of the cell are available. In such a case, simultaneous transmission to each of the designated output ports is not possible. By transmitting at different points in time as the output ports become available, buffer space is more rapidly freed and the delay before entering the switch fabric is reduced for some or all of the cells. Traffic and delays are further reduced by tracking serviced output ports and transmitting only to unserviced output ports.

BRIEF DESCRIPTION OF THE DRAWING

These and other features and advantages of the present invention will become apparent from the following detailed description of the drawing in which.

DETAILED DESCRIPTION OF THE DRAWING

Figure 1:
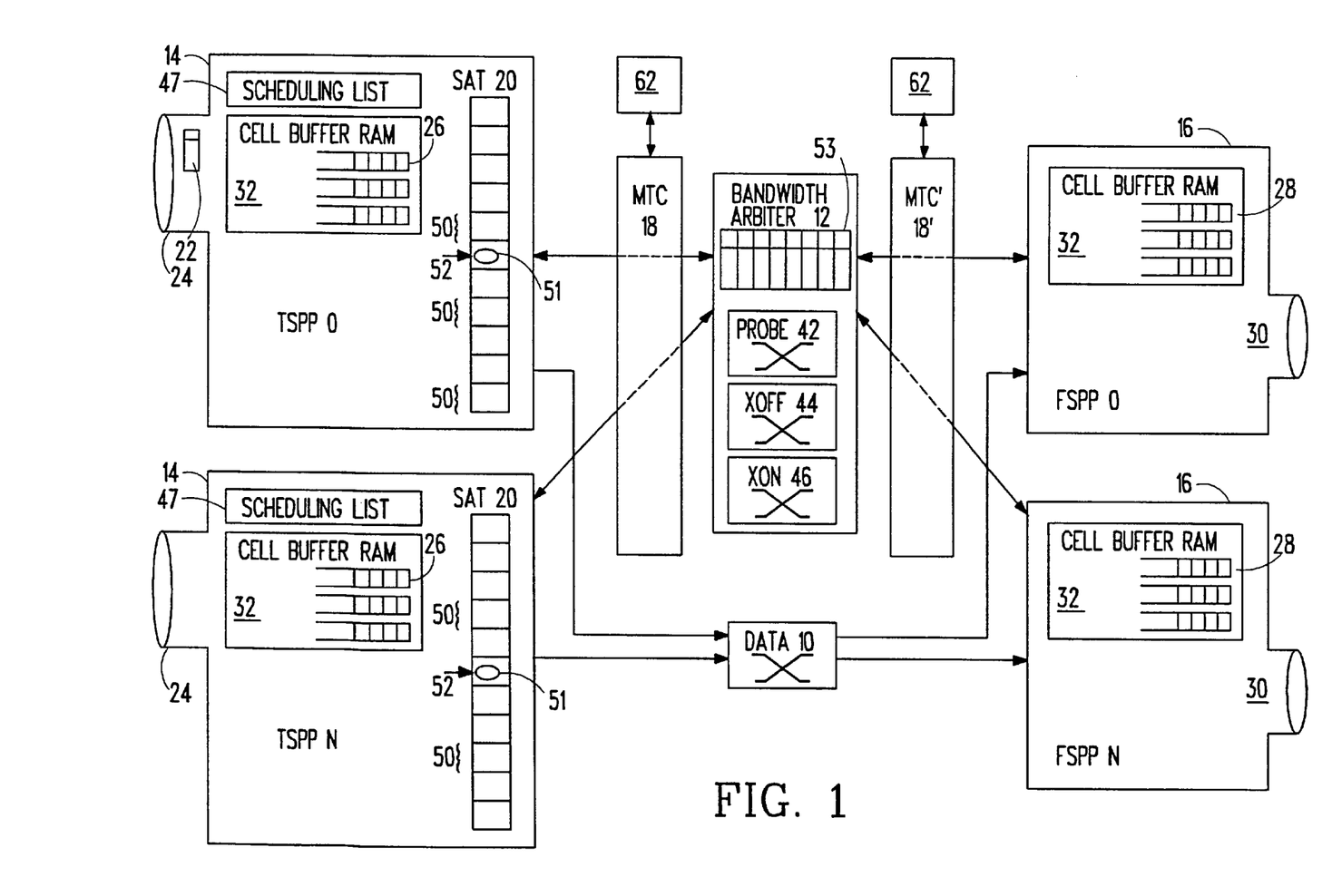
FIG. 1 is a block diagram of a switch which facilitates point-to-multipoint operation.

Referring now to FIG. 1, the switch includes an N×N switch fabric 10, a bandwidth arbiter 12, a plurality of to switch port processors ("TSPP") 14, a plurality of from switch port processors ("FSPP") 16, a plurality of multipoint topology controllers ("MTC") 18 and a plurality of switch allocation tables ("SAT") 20. The N×N switch fabric, which may be an ECL crosspoint switch fabric, is used for cell data transport, and yields N×670 Mbps throughput. The bandwidth arbiter controls switch fabric interconnection, dynamically schedules momentarily unused bandwidth, and resolves multipoint-to-point bandwidth contention. Each TSPP schedules transmission of cells 22 to the switch fabric from multiple connections. The FSPP receives cells from the switch fabric and transmits those cells onto output links. The switch allocation table controls crossbar input to output mapping, connection bandwidth, and the maximum delay through the switch fabric.

In order to traverse the switch, a cell 22 first enters the switch through an input port 24 and is buffered in a queue 26 of input buffers. The cell is then transmitted from the input buffers to a queue 28 of output buffers in an output port. From the output port 30, the cell is transmitted outside of the switch, for example, to another switch. To facilitate traversal of the switch, each input port 24 includes a TSPP 14, and each output port 30 includes an FSPP 16. The TSPPs and FSPPs each include cell buffer RAM 32 which is organized into queues 26, 28. All cells in a connection pass through a single queue at each port, one at the TSPP and one at the FSPP, for the life of the connection. The queues thus preserve cell ordering by handling only one connection per queue. This strategy also allows quality of service ("QoS") guarantees on a per connection basis.

Three communication paths are used to implement flow control within the switch via probe and feedback messages: a Probe Crossbar 42, an XOFF Crossbar 44 and an XON Crossbar 46. The Probe Crossbar 42 is an N×N crosspoint switch fabric which is used to transmit an FSPP multiQueue Number to each FSPP. The multiQueue number identifies a plurality of destination queues for the cell for use in point-to-multipoint connections. The FSPP uses the queue number or multiqueue number to direct a probe to the appropriate output queue or queues and thereby determine if there are enough output buffers available in the destination queues for receipt of the cell or cells.

The XOFF Crossbar 44 is an N×N serial crosspoint switch fabric which is used to communicate "Don't Send" type messages from the FSPP 16 to the TSPP 14. Each TSPP includes a scheduling list 47 of cells to be transmitted. The first bit of the feedback message, namely XOFF, is asserted to halt transmission of request message probes from a particular TSPP, and is thus a state control bit which puts the receiving TSPP scheduling list in an XOFF state, meaning that TSPP Scheduling List 47 will not use bandwidth. XOFF is asserted if the FSPP destination queue is full. The TSPP Scheduling List then remains in the XOFF state until receiving an XON message. The second bit, namely REJECT, is asserted when the entire pool of output buffers at one or more FSPPS has been exhausted. The FSPPs maintain multiple buffer pools for different connection groups. The TSPP responds to an asserted REJECT feedback message by not dequeing the cell through the data crossbar 10. A null cell denoted by a complemented CRC, is transmitted instead. The TSPP responds to an asserted XOFF feedback message by modifying the TSPP XOFF state bits. The XOFF state bits prevent the TSPP from attempting to send a request message from any queue on that Scheduling List until notified by the FSPPs that cell buffers are available.

The XON Crossbar 46 is an N×N serial contention-based switch which is used to communicate "Enable Send" type messages. More particularly, the XON Crossbar is employed to communicate the XON message from the FSPP to the TSPP. When the number of cells in the FSPP destination queue increases above a predetermined threshold the FSPP asserts an XOFF and sets a state bit in a queue descriptor indicating that XOFF is asserted. When the number of cells in the FSPP queue drops below an XON threshold, the XON message is sent from the FSPP to the TSPP. The XON message enables the TSPP Scheduling List to resume sending request messages.

The Probe & XOFF communication paths operate in a pipeline fashion. First, the TSPP 14 selects a scheduling list, and information associated with that scheduling list is used to determine output ports 30 for transmission, i.e., a destination output queue. The bandwidth arbitrator 12 reduces this information to a TSPP-to-FSPP connectivity map which is employed to control the Probe, XOFF, and data crosspoints in sequence. More particularly, the FSPP Queue number or multiQueue number is transmitted to the FSPP using the Probe crossbar 42. The FSPP then tests for buffer availability, and asserts REJECT and/or XOFF on the XOFF crossbar 44 if sufficient buffers are not available. The TSPP then transmits a null cell if REJECT was asserted. If XOFF was asserted, the TSPP puts the Scheduling List into the XOFF state. If sufficient buffers are available, the TSPP transmits the cell to the FSPP output queue through the data crossbar 47.

Figure 2:
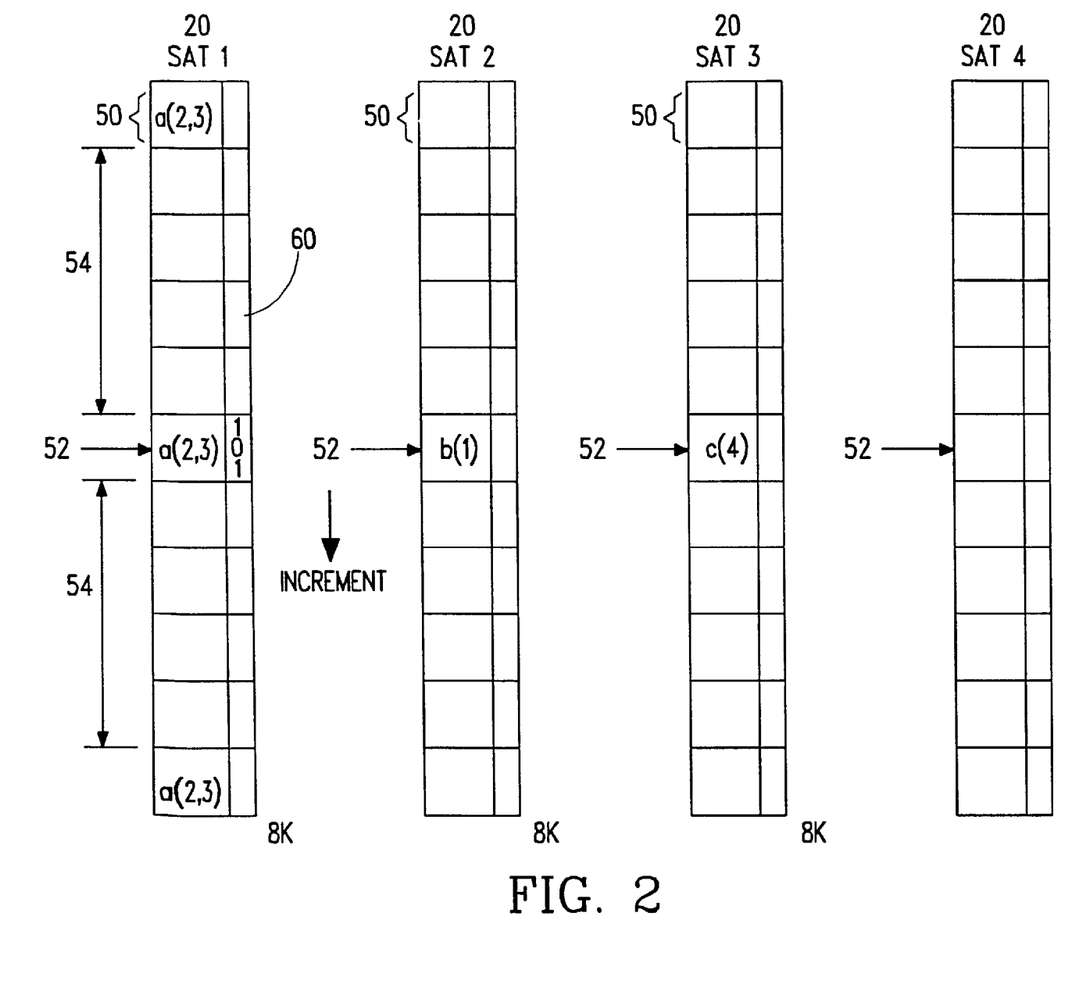
FIG. 2 is a block diagram which illustrates operation of the switch allocation tables of FIG. 1.

Referring now to FIGS. 1 & 2, each TSPP within the switch includes an SAT 20 which manages bandwidth allocation and delay. The SAT is the basic mechanism behind cell scheduling. Each SAT 20 includes a plurality of sequentially ordered cell time slots 50 and a pointer 52 which is directed to one of the slots. All of the pointers in the switch are synchronized such that at any given point in time each of the pointers is directed to the same slot location in the respective SAT with which the pointer is associated, e.g., the first slot. In operation, the pointers are advanced in lock-step, each slot being active for 32 clock cycles at 50 MHz. When the pointer is directed toward a slot, the TSPP uses the corresponding entry 51 in the SAT to obtain a cell for launching into the switch fabric 10. For example, SAT 1 will transmit a cell from connection "a" to output ports "2" and "3" with the pointer in the position illustrated in FIG. 2.

Each of the counters is incremented once for each cell time, and the pointer returns to the first slot after reaching the last slot. Given an SAT depth of 8 k, which defines a frame, the pointers scan the SATs every 6msec, thereby providing a maximum delay for transmission opportunity of 6msec. The delay can be decreased by duplicating a given entry at a plurality of slots within the SAT. The maximum delay that an incoming cell will experience corresponds to the number of slots 54 between the pointer and the slot containing the entry which specifies the destination of the cell. When multiple entries are made in order to decrease the maximum possible number of separating slots, the duplicate entries are preferably spaced equidistantly within the SAT, as illustrated. Hence, maximum delay for transmission opportunity corresponds to the frequency and spacing of duplicate entries within the SAT.

The amount of bandwidth allocated to a particular connection corresponds to the frequency at which a given entry appears in the SAT. Each slot 50 provides 64Kbps of bandwidth. Since the pointers cycle through the SATs at a constant rate, the total bandwidth allocated to a particular connection is equal to the product of 64 Kbps and the number of occurrences of that entry. For example, entry (a,2,3), which occurs in three slots, is allocated 192 Kbps of bandwidth.

Figure 3A:
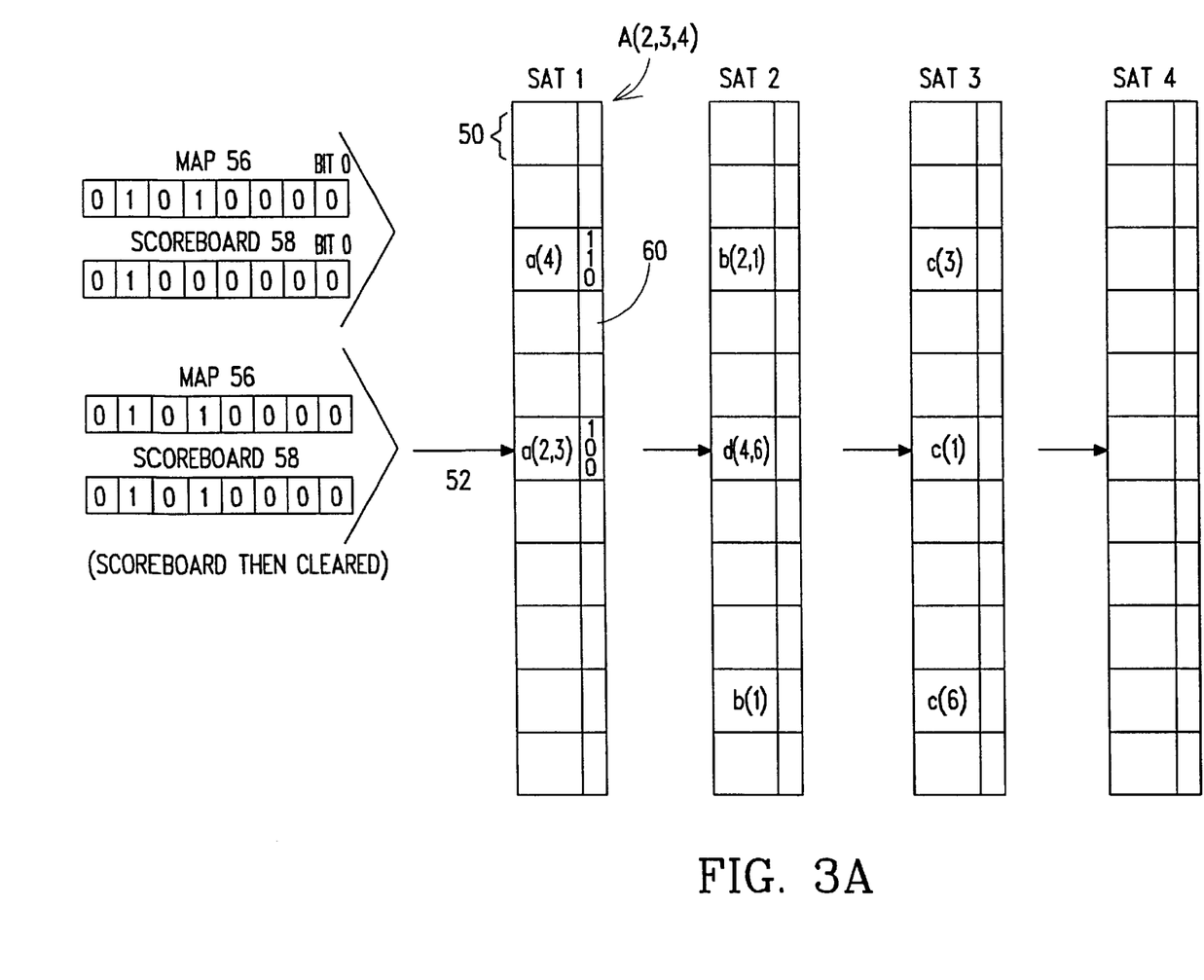
FIGS. 3A and 3B are block diagrams which further illustrates operation of the switch allocation tables.
Figure 3B:
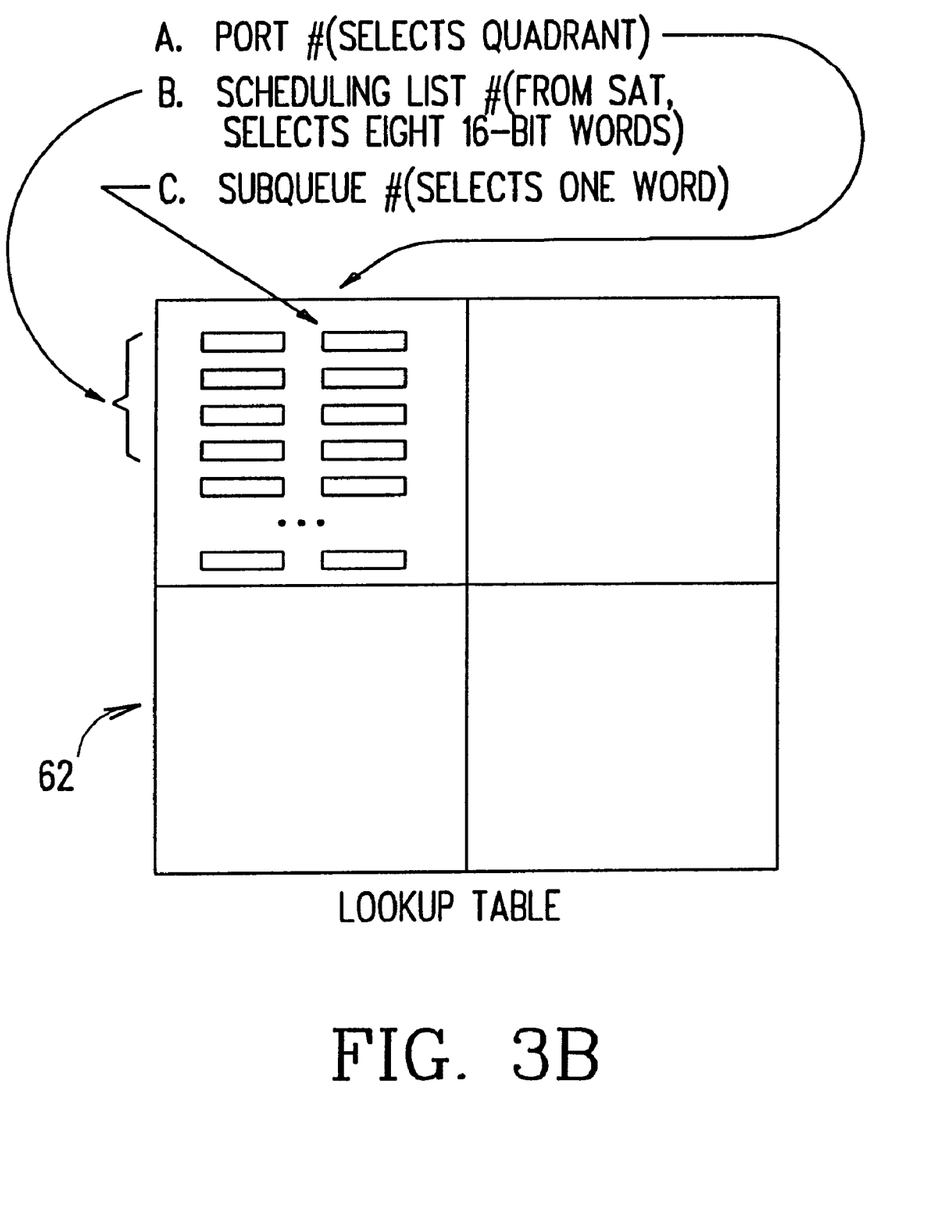

Referring now to FIGS. 1, 3A & 3B, in point-to-multipoint operation a situation will sometimes arise wherein it is not possible to transmit the cell to each output port designated by the entry, typically because of output port conflicts due to other traffic within the switch. To execute point-to-multipoint operation in such a situation, the switch transmits the cells to the designated output ports at different points in time. More particularly, the switch transmits the cell to the designated output ports as those ports become available. For example, connection "a" is designated for ports 2, 3 & 4, but the transmission to port 2 is in conflicts with connection "b" from SAT 2 at a first cell time and the transmission to port 3 is in conflicts with connection "c" from SAT 3 even though the transmission to port 4 is not in conflict. To resolve this situation the transmission to port 4 is executed and the transmission to ports 2 and 3 is delayed. Repeat transmission to an already serviced port is prevented by tracking the serviced ports. Tracking also provides an indication of when all designated output ports have been serviced.

The lookup table is employed to determine the appropriate output ports associated with the entry, e.g., "a (2, 3)." The lookup table includes an area corresponding to each input port (here quadrants), and each quadrant includes words stored therein. The input port number is used to select the appropriate quadrant in the lookup table. The scheduling list number is then used to select a subgroup of eight 16-bit words (for a 16 port switch). Finally, the subqueue number is used to select one word from the subgroup; the word which indicates the output ports for transmission.

In order to track point-to-multipoint transmission executed at different points in time, the switch includes a map 56 and scoreboard 58, and the SAT 20 includes a three bit subqueue 60 field associated with each slot. The map and scoreboard are each 8 bits long and form bitmasks. The map is initialized according to the subqueues which act as offsets into the map. For example, subqueue "110" indicates an offset of 6 and subqueue "100" indicates an offset of 4. Hence, bits 4 and 6 in the map are initialized to logic "1" and the other bits are initialized to logic "0." The scoreboard is initialized to all logic "0" bits.

Tracking is realized by updating the scoreboard when copies of cells are transmitted. When the pointer reaches the slot corresponding to the connection for the enqueued point-to-multipoint cell, e.g., "a (4)," the offset indicated by the subqueue (110 indicating 6) is employed to set bit 6 of the scoreboard. The scoreboard is then compared to the map and if a complete match is determined then each cell has been transmitted and the scoreboard is cleared. If the map and scoreboard do not match completely then the point-to-multipoint transmission has not been made to each designated output queue. The updated scoreboard and map thus track which designated output ports have received copies of the cell.

Figure 4:
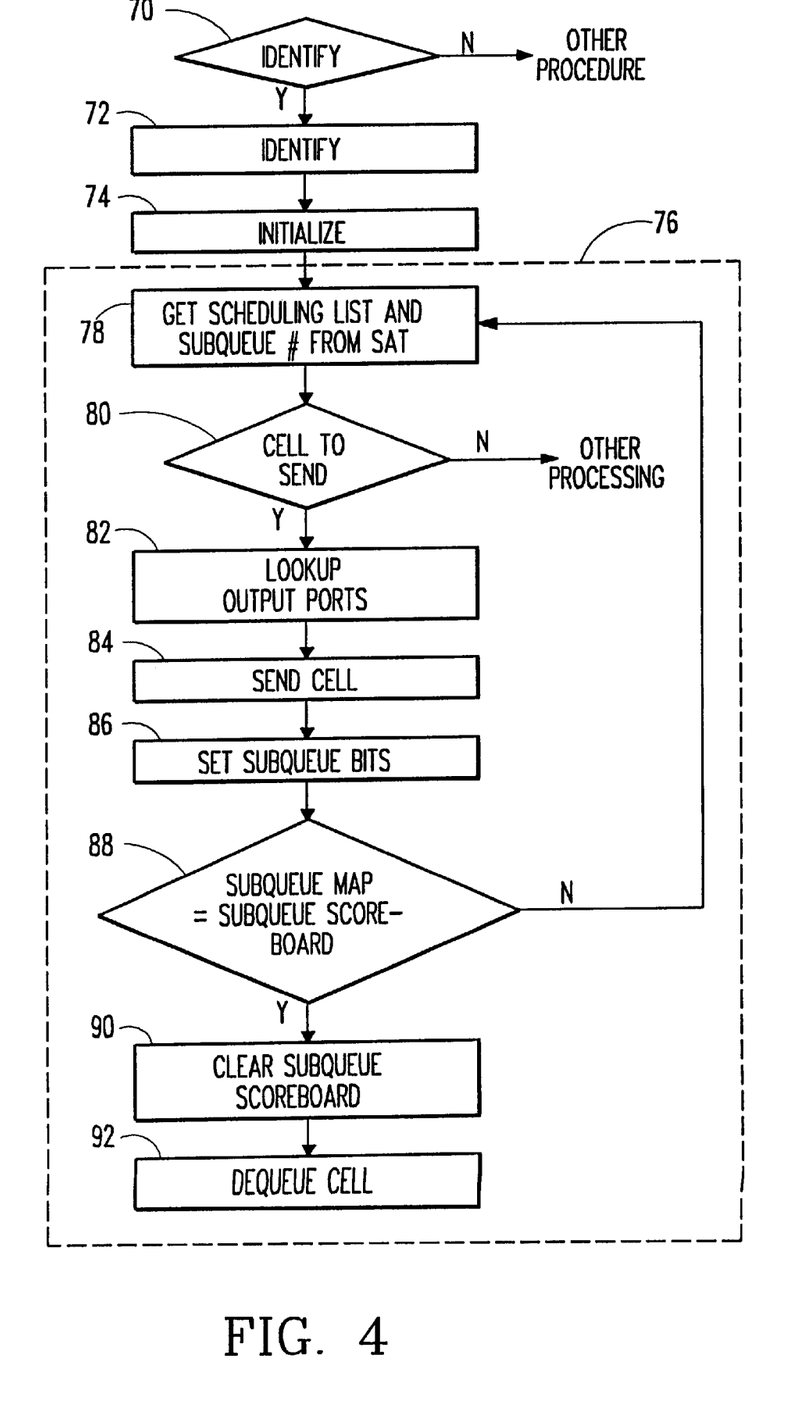
FIG. 4 is a flow diagram which illustrates a method for point-to-multipoint operation.

FIG. 4 illustrates a method for point-to-multipoint operation. In an initial step 70 the need for a point-to-multipoint connection with allocated bandwidth is identified. In a following step 72 output port conflicts are identified. If there are no conflicts, the copies of the cell can be transmitted to each designated output port simultaneously. If there are conflicts, the point-to-multipoint transmission is broken into pieces to avoid the output port conflicts. To do so, the map and scoreboard are initialized 74. Flow then continues to a transmission portion 76 to transmit each copy and determine when each designated output port has been serviced.

The transmission portion is looped until each output port has been serviced. In step 78 the scheduling list number and subqueue number are retrieved from the SAT. A determination 80 is then made as to whether a cell is available to transmit. If no cell is available, other processing takes place. If a cell is available, the output ports are determined by indexing into the bit vector lookup table with the entry in the subqueue in step 82. Copies of the cell are then transmitted to the available output ports in step 84. The subqueue bit is then set in step 86 and a determination 88 is made as to whether the subqueue scoreboard is equal to the subqueue map, i.e., whether all of the designated output ports have been serviced. If the subqueue scoreboard is equal to the subqueue map, then all output ports have been serviced and the scoreboard is cleared 90 and the cell is dequeued 92. If the subqueue scoreboard is not equal to the subqueue map, i.e., some designated output ports remain unserviced, flow returns to step 78.

Having described the preferred embodiments of the invention, it will now become apparent to one of skill in the art that other embodiments incorporating their concepts may be used. It is felt therefore that the invention should not be limited to disclosed embodiments, but rather should be limited only by the spirit and scope of the appended claims.

What is claimed is:

1. A switch for receiving a data unit and for transmitting the data unit to a plurality of designated destinations, comprising:

a plurality of input ports operative to receive the data unit in one of said plurality of input ports;

a first shared data unit buffer memory collectively associated with said plurality of input ports for buffering the data unit received in said one of said plurality of input ports;

a second shared data unit buffer memory for buffering copies of the data unit transmitted from said first shared data unit buffer memory to said second shared data unit buffer memory;

a plurality of output ports collectively associated with said second shared data unit buffer memory, said output ports operative to transmit the copies of the data unit transmitted to the second shared data unit buffer memory to at least one of the plurality of designated destinations; and a tracking device operative to track receipt of the copies of the data unit by said second shared data unit buffer memory at different points in time, whereby the data unit received in said input port may be transmitted to said second shared data unit buffer memory at different points in time without executing redundant transmission to any given selected output port.

2. The switch of claim 1 further including a scoreboard bitmask having a plurality of bits, each bit corresponding to one of a plurality of subqueues, wherein each subqueue is associated with one or more output ports.

3. The switch of claim 2 further including a map bitmask having a plurality of bits, each bit corresponding to one of said plurality of subqueues, wherein each subqueue is associated with one or more output ports and said bits are set corresponding to eligible output ports.

4. The switch of claim 3 further including a switch allocation table associated with each input port of said plurality of input ports, said switch allocation table having a plurality of entries and a pointer directed toward one of said plurality of entries, each switch allocation table entry being associated with a connection identifier and at least one output port identifier, said pointer being incremented through said entries at a predetermined rate.

5. The switch of claim 4 wherein said switch allocation table includes a subqueue field having an entry associated with each input port of said plurality of input ports, said subqueue entries including an index to a table of unserviced output ports.

6. The switch of claim 5 further including a bit vector lookup table including output port identifiers, said bit vector lookup table providing identifiers of unserviced output ports for a given connection when indexed by said subqueue field entry.

7. A method for point-to-multipoint transmission of a data unit from a telecommunications switch having a plurality of input ports and a plurality of output ports comprising the steps of:

receiving the data unit in the switch;

designating a plurality of the output ports for receipt of copies of the data unit;

determining which output ports of the plurality of output ports are available for receipt of a copy of the data unit;

transmitting a copy of the data unit to each output port identified as being available for receipt of a copy of the data unit; and delaying transmission of a copy of the data unit to each output port identified as not being available for receipt of a copy of the data unit until a later point in time, whereby the data unit may be transmitted to the designated output ports at different points in time without executing redundant transmission to any given designated output port.

8. The method of claim 7 including the further step of initializing a scoreboard of unserviced output ports designated in said designating step.

9. The method of claim 8 including the further step of retrieving a subqueue index entry from a switch allocation table.

10. The method of claim 9 including the further step of indexing a bit vector lookup table with the retrieved subqueue index entry to obtain at least one output port identifier.

11. The method of claim 10 including the further step of setting the subqueue index entry based upon the copies of the data unit transmitted in said transmitting step.

12. The method of claim 11 including the further step of comparing the subqueue to the scoreboard to determine whether each designated output port has been serviced.

13. The method of claim 12 including the further step of updating the scoreboard to indicate which output ports have been serviced.

14. The method of claim 13 including the further step of clearing the scoreboard if each designated output port has been serviced.

15. The method of claim 14 including the further step of dequeing the data unit when each designated output port has been serviced.

16. An asynchronous transfer mode ("ATM") switch for transmitting copies of a cell received at an input port of said switch to a plurality of output ports of said switch through a switch fabric, comprising:

a clock generator operative to generate cell time intervals;

at least one cell transmission controller for controlling transmission of copies of the cell at different points in time over a plurality of cell time intervals when output port conflicts prevent transmission of copies of the cell to said plurality of output ports during a single time interval;

a tracking device for tracking which output ports of said plurality of output ports have received a copy of the cell, thereby avoiding transmission of redundant copies of the cell to already-serviced output ports; and an output port map indicating which output ports are initially eligible to receive a copy of the cell.

17. The ATM switch of claim 16 further including a scoreboard bitmask indicating which output ports have received a copy of the cell.

18. The ATM switch of claim 17 wherein said scoreboard is updated for each cell time interval in which a copy of the cell is transmitted.

19. The ATM switch of claim 18 further including a plurality of switch allocation tables ("SATs"), each SAT including a plurality of sequentially ordered cell time slots, a subqueue associated with each cell time slot, and a synchronized pointer directed toward one of said cell time slots such that at any given point in time each said synchronized pointer is directed to a corresponding slot in the respective SAT with which said pointer is associated.

20. The ATM switch of claim 19 further including a lookup table having a respective area associated with each said input port, said input ports being identified by input port numbers.

21. The ATM switch of claim 20 further including a plurality of scheduling lists of cells to be transmitted through said switch.

22. The ATM switch of claim 21 wherein said cell transmission controller:

a) utilizes said input port number to select an area of said lookup table associated with the input port transmitting the cell, b) employs the scheduling list number to select a subgroup of words from said area selected with the input port number, and c) employs the subqueue number to select a single word from said subgroup, wherein said word indicates output ports for transmission of copies of the cell.

23. The ATM switch of claim 22 wherein said subqueue field contains a three bit number.

24. The ATM switch of claim 23 wherein said output port map and said scoreboard are each eight bits in length, respectively.

25. The ATM switch of claim 24 wherein said subqueues provide an offset into said output port map for initialization thereof.

* * * * *

UNITED STATES PATENT AND TRADEMARK OFFICE
CERTIFICATE OF CORRECTION

PATENT NO. : 6,141,346
DATED : October 31, 2000
INVENTOR(S) : Stephen A. Caldara et al.

It is certified that error appears in the above-identified patent and that said Letters Patent is hereby corrected as shown below:

Column 2,
Line 49, "("MTC") 18" should read -- ("MTC"), 18' -- ;
Line 55, "bandwidth" should -- bandwidth, --;

Column 3,
Line 35, "ESPPS" should read -- FSPP5 --;

Column 4,
Line 58, "conflicts" should read -- conflict --; and
Line 60, "conflicts" should read -- conflict --.

Signed and Sealed this

Twenty-sixth Day of March, 2002

Attest:

JAMES E. ROGAN
*Attesting Officer*  *Director of the United States Patent and Trademark Office*